United States Patent
Stuart (10) Patent No.: US 7,058,259 B2
(45) Date of Patent: Jun. 6, 2006

(54) OPTICAL DEVICE HAVING A WAVEGUIDE LENS WITH MULTIMODE INTERFERENCE

(75) Inventor: Howard R. Stuart, East Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 232 days.

(21) Appl. No.: 10/640,958

(22) Filed: Aug. 14, 2003

(65) Prior Publication Data

US 2005/0036737 A1   Feb. 17, 2005

(51) Int. Cl.
G02B 6/32   (2006.01)
G02B 6/14   (2006.01)

(52) U.S. Cl. .............. 385/28; 385/31; 385/33
(58) Field of Classification Search .............. 385/1, 385/27–33
See application file for complete search history.

(56) References Cited

U.S. PATENT DOCUMENTS

| | | | |
|---|---|---|---|
| 4,755,014 A | 7/1988 | Stoll et al. | 350/96.12 |
| 4,856,861 A | 8/1989 | Miyawaki et al. | 350/96.14 |
| 4,983,499 A | 1/1991 | Suzuki et al. | 430/321 |
| 6,768,758 B1 * | 7/2004 | Hamamoto | 372/46 |
| 2002/0150333 A1 * | 10/2002 | Reed et al. | 385/34 |

FOREIGN PATENT DOCUMENTS

JP   06337446 A * 12/1994

OTHER PUBLICATIONS

"Optical Multi-Mode Interference Devices Based on Self-Imaging: Principles and Applications," by Lucas B. Soldano and Erik C. M. Pennings, Journal of Lightwave Technology, vol. 13. No. 4, Apr. 1995, pp. 615-627.

* cited by examiner

Primary Examiner—Michelle Connelly-Cushwa (57) ABSTRACT

In one embodiment, a waveguide lens of the invention has a pair of planar waveguides, e.g., a single-mode waveguide connected to a multimode waveguide. The widths of the two waveguides and the length of the multimode waveguide are selected such that particular mode coupling between the waveguides and multimode interference (MMI) effects in the multimode waveguide cause the latter to output a converging beam of light similar to that produced by a conventional waveguide lens. Advantageously, waveguide lenses of the invention may be used to implement low-loss, low-crosstalk waveguide crossings and/or compact waveguide turns. In addition, waveguide lenses of the invention can be readily and cost-effectively incorporated into waveguide devices designated for large-scale production.

20 Claims, 8 Drawing Sheets

OPTICAL DEVICE HAVING A WAVEGUIDE LENS WITH MULTIMODE INTERFERENCE

BACKGROUND OF THE INVENTION

1. Field of the Invention

The present invention relates to optical communication equipment and, more specifically, to optical waveguide devices.

2. Description of the Related Art

Figure 1:
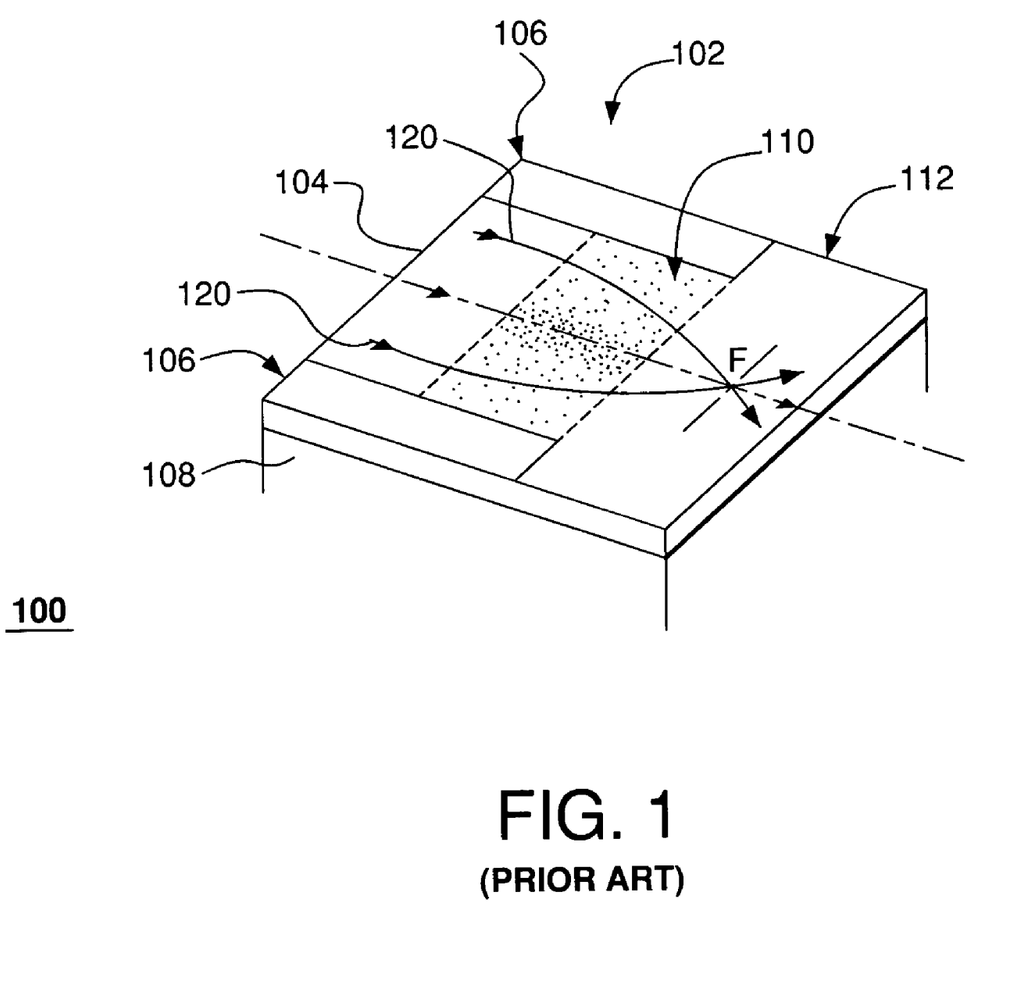
FIG. 1 shows a three-dimensional perspective view of an optical device having a prior-art waveguide lens.

FIG. 1 shows a three-dimensional perspective view of an optical device 100 having a prior art waveguide lens 110. More specifically, device 100 includes a planar waveguide 102 having a core region 104 and two cladding regions 106 formed on a substrate 108. The index of refraction of core region 104 is higher than those of cladding regions 106 and substrate 108, which provides both lateral and transverse confinement of light in the core region. Waveguide 102 is coupled via lens 110 to a slab region 112, which has the same index of refraction as core region 104. Similar to waveguide 102, slab region 112 provides the transverse confinement of light due to the index of refraction contrast between that region and substrate 108. However, due to the absence of the corresponding cladding regions adjacent to slab region 112, the light is not laterally confined in the slab region.

Lens 110 is formed by creating an appropriate index of refraction gradient in a terminal portion of waveguide 102. More specifically, the index of refraction within lens 110 gradually increases from the lens periphery to the lens center axis as indicated by the density of dots in FIG. 1. The gradient causes light rays 120 propagating through lens 110 to bend and eventually converge, as shown in FIG. 1, at focal plane F located within slab region 112. The light-focusing action of lens 110 is similar to that of a free-space convex lens.

A representative fabrication method for waveguide lenses similar to lens 110 includes a number of steps described in detail, for example, in U.S. Pat. No. 4,983,499, the teachings of which are incorporated herein by reference. Briefly, a thin film of a suitable diffusion metal is deposited over a terminal portion of waveguide 102. The film has a non-uniform thickness with the thickness profile corresponding to the desired index of refraction distribution in lens 110. Device 100 is annealed at a relatively high temperature to imbed the metal from the film into core region 104 of waveguide 102, whereby creating lens 110.

One problem with lens 110 is that the diffusion film used for its fabrication has an inherently small thickness, which turns the task of creating a thickness profile accurately representing the desired index of refraction distribution into a relatively difficult proposition. As a result, incorporation of waveguide lenses similar to lens 110 into waveguide devices designated for large-scale production may not be practical.

SUMMARY OF THE INVENTION

Problems in the prior art are addressed, in accordance with the principles of the present invention, by a waveguide lens with multimode interference. In one embodiment, a waveguide lens of the invention has a pair of planar waveguides, e.g., a single-mode waveguide connected to a multimode waveguide. The widths of the two waveguides and the length of the multimode waveguide are selected such that particular mode coupling between the waveguides and multimode interference (MMI) effects in the multimode waveguide cause the latter to output a converging beam of light similar to that produced by a conventional waveguide lens. Advantageously, waveguide lenses of the invention may be used to implement low-loss, low-crosstalk waveguide crossings and/or compact waveguide turns. In addition, waveguide lenses of the invention can be readily and cost-effectively incorporated into waveguide devices designated for large-scale production.

According to one embodiment, the present invention is an optical device having an optical waveguide lens, the lens comprising a first optical waveguide connected to a second optical waveguide, wherein: the second waveguide is a multimode waveguide; a first mode of the first waveguide couples to at least two modes of the second waveguide; and the second waveguide has a length selected such that, when the first mode excites the at least two modes, the second waveguide outputs a converging beam of light.

According to another embodiment, the present invention is an optical device, comprising a first waveguide lens optically coupled to a second waveguide lens via a slab region, wherein: for each of the first and second waveguide lenses, the waveguide lens comprises a first optical waveguide connected to a second optical waveguide, wherein: the second waveguide is a multimode waveguide; a first mode of the first waveguide couples to at least two modes of the second waveguide; and the second waveguide has a length selected such that, when the first mode excites the at least two modes, the second waveguide outputs a converging beam of light.

According to yet another embodiment, the present invention is a method of transmitting optical signals, the method comprising: (A) coupling an optical signal to a first mode of a first waveguide; and (B) applying the first mode of the first waveguide to a second waveguide, wherein: the second waveguide is a multimode waveguide; the first mode of the first waveguide couples to at least two modes of the second waveguide; and the second waveguide has a length selected such that, when the first mode excites the at least two modes of the second waveguide, substantially full energy of said first mode is transferred into a converging beam of light output from the second waveguide.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 2:
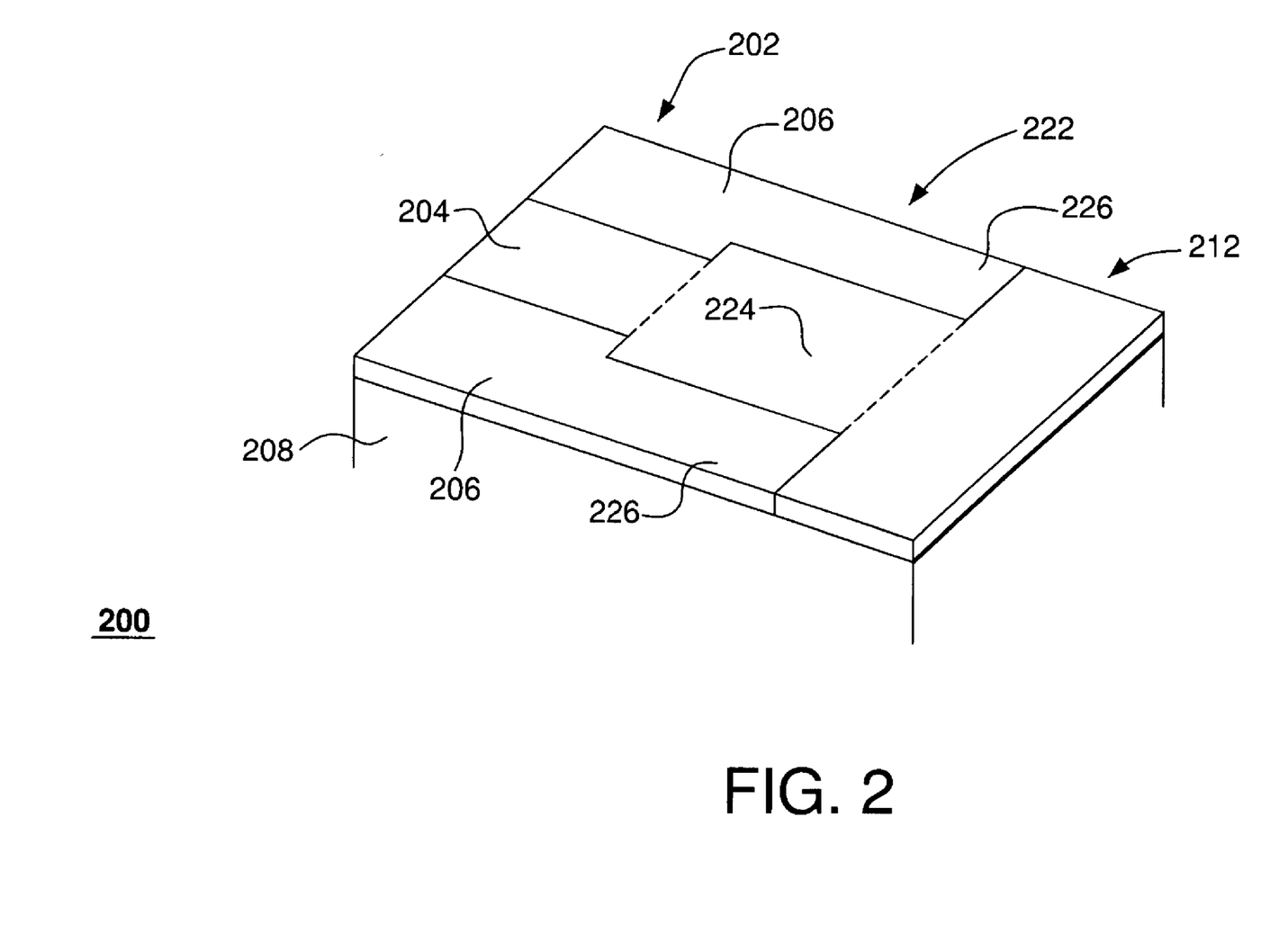
FIG. 2 shows a three-dimensional perspective view of an optical device according to one embodiment of the present invention.

FIG. 2 shows a three-dimensional perspective view of an optical device 200 according to one embodiment of the present invention. Device 200 is analogous to device 100 of FIG. 1 and includes a first planar waveguide 202 coupled to a second planar waveguide 222, the latter coupled to a slab region 212. Each waveguide has a core region and two adjacent cladding regions formed on a substrate 208. In particular, waveguide 202 has core region 204 and cladding regions 206, and waveguide 222 has core region 224 and cladding regions 226. In a preferred embodiment, the widths of core regions 204 and 224 are selected such that waveguides 202 and 222 are single-mode and multimode waveguides, respectively. In an alternative embodiment, both waveguides may be multimode waveguides. As will be shown below, waveguides 202 and 222 can be designed such that a light beam output from waveguide 222 into slab region 212 will not initially diverge in the slab region, but rather will come to a focus. The light focusing properties of the waveguide pair are due to (i) particular mode coupling between waveguides 202 and 222 and (ii) multimode interference (MMI) effects in waveguide 222. Hereafter, a matched waveguide pair exhibiting such light-focusing properties is referred to as an MMI waveguide lens.

Advantageously, fabrication of MMI waveguide lenses can be implemented using conventional waveguide-circuit technology. As such, MMI waveguide lenses can be readily and cost-effectively incorporated into waveguide devices designated for large-scale production. For comparison, fabrication of prior-art waveguide lenses, e.g., lens 110 of FIG. 1, requires additional, relatively complex fabrication steps not suitable for such large-scale production.

A good overview of MMI effects in planar waveguide circuits can be found, for example, in an article by Lucas Soldano and Erik Pennings published in 1995 in Journal of Lightwave Technology, vol. 13, pp. 615–627, the teachings of which article are incorporated herein by reference. Using the theory of self-imaging described in the article, the light-focusing properties of the MMI waveguide lens in device 200 can be explained as follows. A single (preferably fundamental) mode propagating in waveguide 202 is introduced non-adiabatically into waveguide 222 through the step-like transition between the two waveguides. Since the electromagnetic (EM) field corresponding to that single mode is not an eigenstate of waveguide 222, it excites two or more modes of that waveguide. The excited modes beat against each other as they propagate along waveguide 222.

The length of waveguide 222 and the width of its core region 224 are chosen such that, at the contact plane of waveguide 222 with slab region 212, the superposition of modes creates an EM field corresponding to a light beam converging into the slab region. For example, the intensity distribution and phase profile corresponding to said EM field may be similar to those created by lens 110 at the contact plane of that lens with slab region 112 in device 100 (FIG. 1). As a result, the beam propagating within slab region 212 will initially converge, come into focus at a certain distance from the contact plane, and then diverge past that distance, thereby exhibiting beam proprieties characteristic of a light beam after passing through a conventional convex lens.

Figure 3:
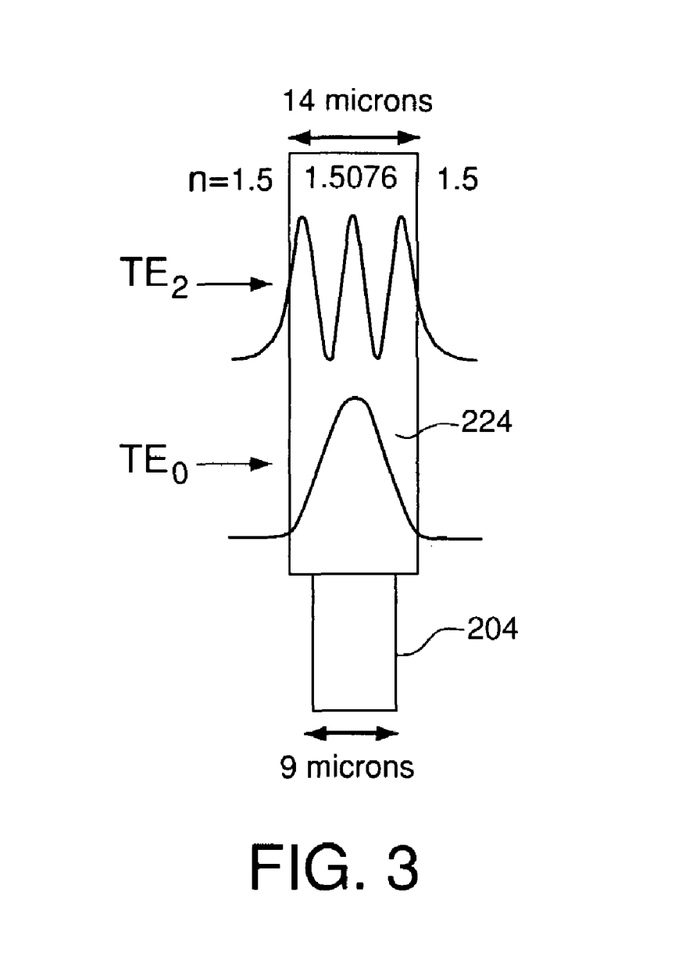
FIG. 3 graphically illustrates power profiles of fundamental mode $TE_0$ and next even mode $TE_2$ in the multimode waveguide of the device shown in FIG. 2.
Figure 4:
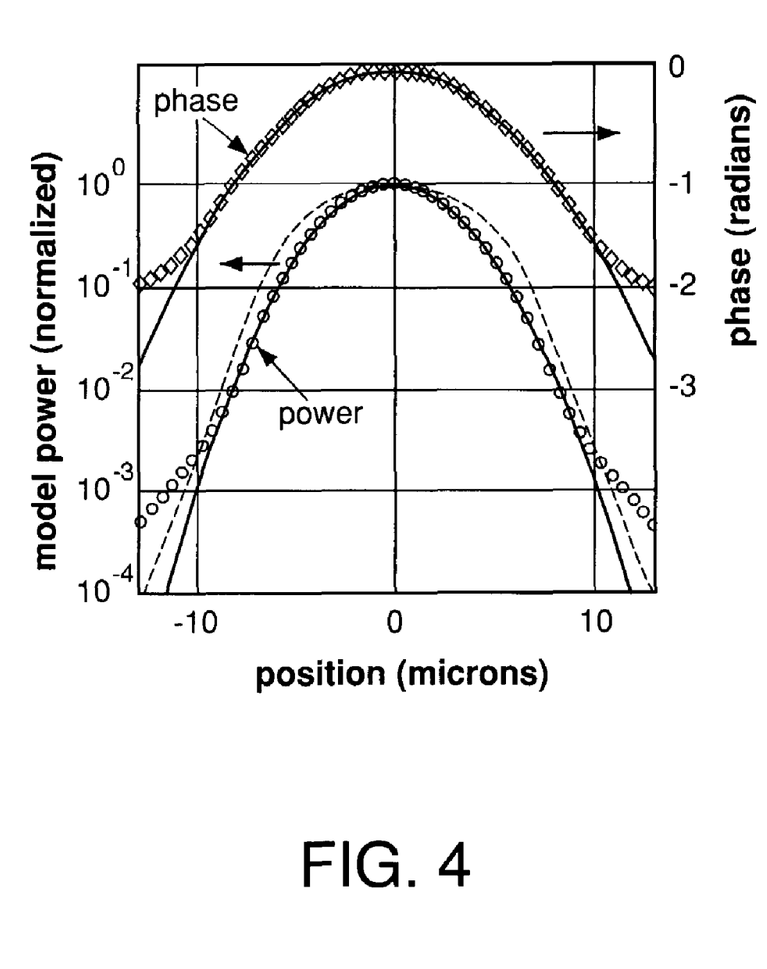
FIG. 4 graphically illustrates a representative power distribution and the corresponding phase profile across the contact plane of the multimode waveguide with the slab region in the device shown in FIG. 2.

FIGS. 3 and 4 graphically illustrate EM field parameters in device 200 for wavelength $\lambda=1.55$ μm, when waveguides 202 and 222 are implemented with the following characteristics: (i) the widths of core regions 204 and 224 are 9 and 14 μm, respectively; (ii) the length of waveguide 224 is 266 μm; (iii) cladding regions 206 and 226 have an index of refraction value, $n_{cl}$, of 1.5000; and (iv) core regions 204 and 224 have an index of refraction value, $n_{core}$, of 1.5075, which corresponds to an index of refraction contrast, $\Delta=(n_{core}-n_{cl})/n_{cl}$, of 0.5%. In this implementation, waveguide 202 is a multimode waveguide supporting two TE modes and waveguide 222 is a multimode waveguide supporting three TE modes. For the following discussion, it is assumed that only the fundamental mode ($TE_0$) is excited in waveguide 202. This can be implemented, for example, by having waveguide 202 connected through an adiabatic tapered transition to a single-mode (e.g., 5-μm) waveguide (not shown in FIG. 2). Due to the symmetry constraints, light from the single-mode waveguide will substantially couple only to the $TE_0$ mode (and not to the $TE_1$ mode) in waveguide 202.

FIG. 3 graphically illustrates modal power across waveguide 222 for fundamental mode $TE_0$ and next even mode $TE_2$. When center axes of waveguides 202 and 222 are aligned with respect to each other, only the shown $TE_0$ and $TE_2$ modes can be excited in waveguide 222 by light coupled from waveguide 202 due to the $C_2$ symmetry of the waveguide structure. The relative intensity of the two modes is determined by the widths of core regions 204 and 224, and the phase difference between the two modes at the contact plane of waveguide 222 with slab region 212 is a function of length of waveguide 222. For example, for the widths of 9 and 14 μm, the $TE_0$-to-$TE_2$ power ratio is about 17:1 (or about 94.4% to 5.6%) and, for the length of 266 μm, the phase difference is about $0.73\pi$.

FIG. 4 graphically illustrates a representative power distribution and the corresponding phase profile across the contact plane of waveguide 222 with slab region 212. The power distribution (circles) is given in FIG. 4 by the lower trace along with a Gaussian fit (solid line). As indicated by the fit, the observed EM field is substantially Gaussian over nearly two and a half orders of magnitude of power values. For comparison, the power distribution of the fundamental ($TE_0$) mode is also shown in FIG. 4 by the dashed line. The phase profile (diamonds) is given in FIG. 4 by the upper trace along with a quadratic fit (solid line). The observed phase displays a nearly perfect quadratic behavior over the span of −10 to 10 μm, with the center axis of the waveguide structure located at 0 μm. The results of FIG. 4 indicate that the EM field produced by the MMI waveguide lens in device 200 very closely resembles that of a focusing Gaussian beam. As such, when this field is introduced into slab region 212, it launches a converging, substantially Gaussian beam having the initial width at half-maximum (WHM) of about 5.5 µm. The beam comes to a focus at a distance of about 37.8 µm from the launch plane, after which distance it begins to diverge. This distance can be referred to as the focal length of the MMI waveguide lens.

Figure 5:
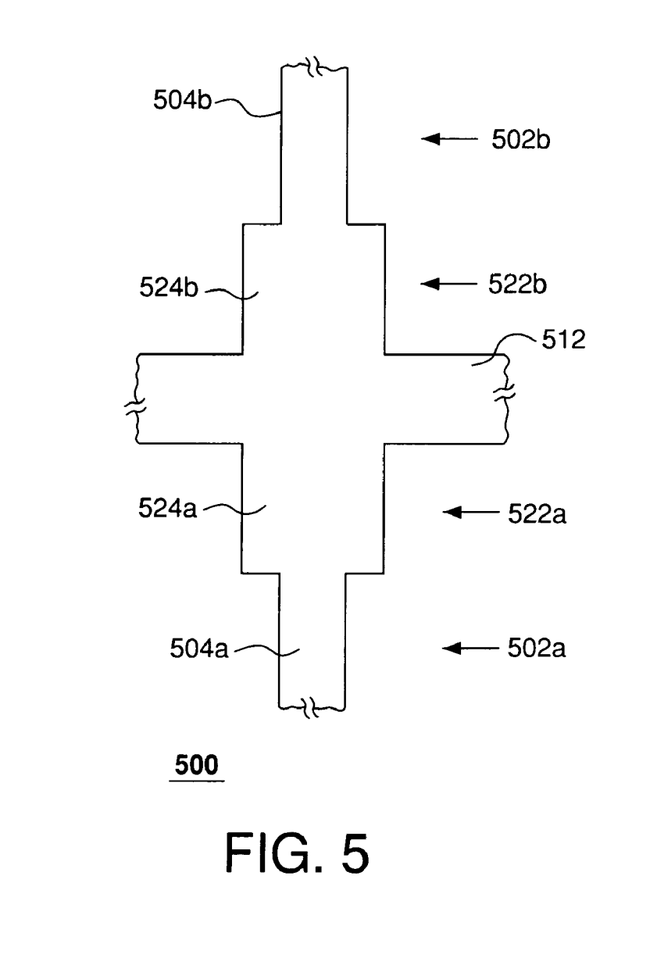
FIG. 5 shows a top view of an optical device according to another embodiment of the present invention.

FIG. 5 shows a top view of an optical device 500 according to another embodiment of the present invention. Device 500 is similar to device 200 of FIG. 2 and has two substantially equivalent MMI waveguide lenses optically coupled across a slab region 512. More specifically, each MMI waveguide lens includes a matched pair of waveguides 502 and 522 outlined in FIG. 5 by the contours of their respective core regions 504 and 524. Each of waveguides 502a–b and 522a–b is similar to the corresponding waveguide in device 200 marked with the label having the same last two digits. In a preferred implementation, the size of slab region 512 is selected to be about two focal lengths of either MMI waveguide lens, which puts the focal planes of both lenses at the center of the slab region. In a different embodiment, a device similar to device 500 may be fabricated with two non-equivalent MMI waveguide lenses. The preferred size of the slab region across which those MMI waveguide lenses are coupled would then be a sum of the focal lengths of the lenses.

Figure 6:
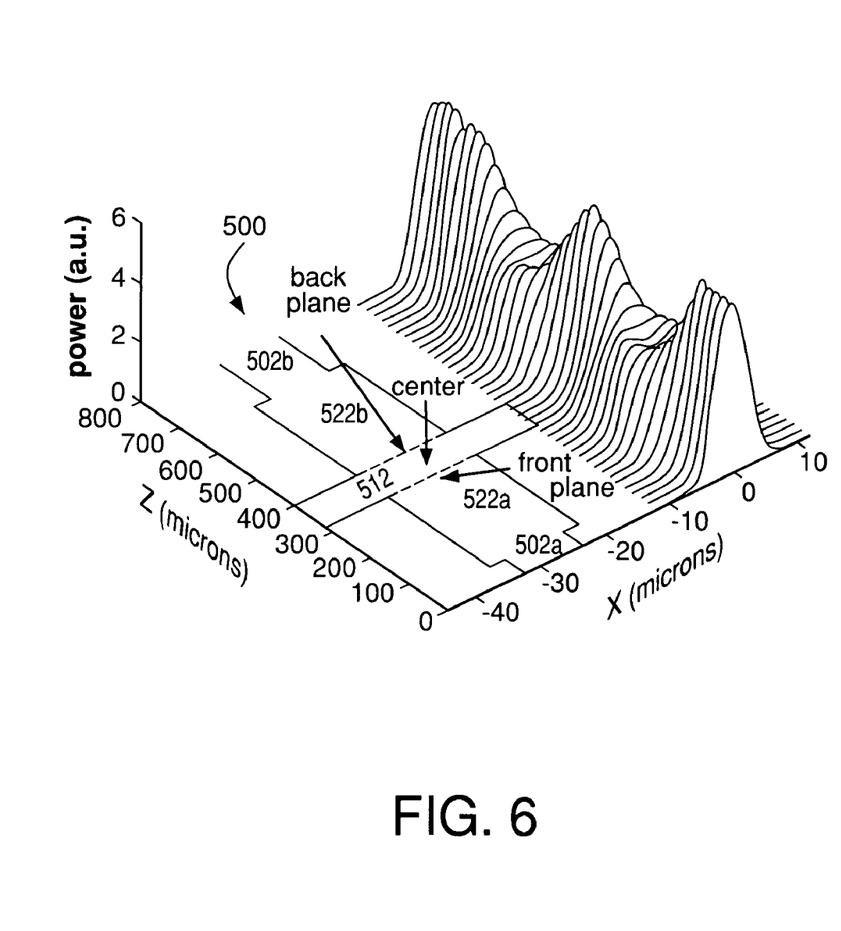
FIG. 6 graphically illustrates the optical power profile for a representative implementation of the device shown in FIG. 5.

FIG. 6 graphically illustrates the optical power profile in one representative implementation of device 500. More specifically, the power profile is represented by a plurality of power cross-sections obtained using two-dimensional beam propagation (BPM) simulations and shown at 20-µm increments. The contour of device 500, to which the power profile shown in FIG. 6 corresponds, is for clarity shifted along the X-axis by −28 µm.

Referring to FIG. 6, the fundamental mode of waveguide 502a is applied to waveguide 522a, which excites the $TE_0$ and $TE_2$ modes in the latter waveguide. The observed drop in peak power in waveguide 522a compared to that in waveguide 502a is due to the distribution of power over the wider core region of waveguide 522a. In slab region 512, there is no lateral guiding mechanism, and yet the beam formed by waveguides 502a and 522a comes to a focus at the center of the slab region as indicated by the power maximum produced thereat due to the above-described light-focusing properties of the matched waveguide pair. Inspection of the power cross-sections corresponding to slab region 512 reveals that the substantially Gaussian shape of the beam is preserved along the entire beam propagation path in that region. In addition, each of the phase profiles (not shown) at the front and back planes (see FIG. 6) of slab region 512 can be accurately approximated by a single parabola, with the positive version of the parabola representing the phase profile at the front plane and the negative version of that parabola representing the phase profile at the back plane. As can be appreciated by one skilled in the art, these self-imaging properties of the beam formed by waveguides 502a and 522a enable low-loss beam coupling into a similar matched waveguide pair, i.e., waveguides 522b and 502b. Indeed, comparison of optical power in waveguides 502a and 502b indicates that the total end-to-end power loss (i.e., power loss from waveguide 502a to waveguide 502b) is only about 0.036 dB. For comparison, if the fundamental mode of waveguide 502a were coupled to waveguide 502b directly across slab region 512 (i.e., without passing through waveguides 522a–b), the total power loss would be about 0.75 dB.

Table 1 summarizes results of BPM simulations for three representative implementations of device 500 including the implementation shown in FIG. 6. For each implementation, the total end-to-end power loss is less than 0.1 dB, which provides an improvement of at least one order of magnitude over the loss (the last column in Table 1) in the corresponding device not employing MMI waveguide lenses. The sum of the lengths of waveguide 522 and slab region 512 appears to scale linearly with the modal beat length, being about 112% of the latter. The beat length, which is inversely proportional to the difference of the effective refraction indices of the two modes, decreases as the index of refraction contrast increases, resulting in shorter waveguides 522, and also shorter focal lengths of the resulting MMI waveguide lenses. This relationship suggests that, for a given contrast value, there is a range of achievable focal lengths in the MMI waveguide lens structure. The shortest possible focal length appears to be related to the beat length for the narrowest possible waveguide 522 that can support two even TE modes, whereas an increase of the focal length is achieved by increasing the width of waveguide 522, with the longest possible focal length achieved at the width corresponding to the appearance of the third even TE mode in waveguide 522. Based on the results of Table 1, one can conclude that device 500 can (i) be implemented using a variety of materials (Δ values) and (ii) be appropriately designed to exhibit low-loss end-to-end coupling for different selected widths of feeding waveguides 502.

TABLE 1

Parameters and Performance for Three Representative Implementations of Device 500

| Δ (%) | Width of core region 504 (µm) | Width of core region 524 (µm) | Length of waveguide 522 (µm) | Length of slab region 512 (µm) | Loss (dB) | $TE_0$/$TE_2$ beat length (µm) | BPM increment (µm) | Loss w/o waveguides 522 (dB) |
|---|---|---|---|---|---|---|---|---|
| 0.5 | 9 | 14 | 266 | 88 | 0.036 | 316 | 0.25 | 0.75 |
| 2 | 5 | 7.5 | 68 | 30 | 0.032 | 87.5 | 0.1250 | 1.05 |
| 4 | 3.1 | 5 | 32 | 13 | 0.063 | 40.6 | 0.0625 | 1.10 |

The following description is related to exemplary applications of MMI waveguide lenses of the invention in planar waveguide circuits. One application of MMI waveguide lenses is to improve the performance of waveguide crossings. The ability to cross waveguides with low loss and low crosstalk becomes important because, with ever-increasing circuit densities, topological constraints of the two-dimensional geometry typically force the use of waveguide crossings.

Figure 7:
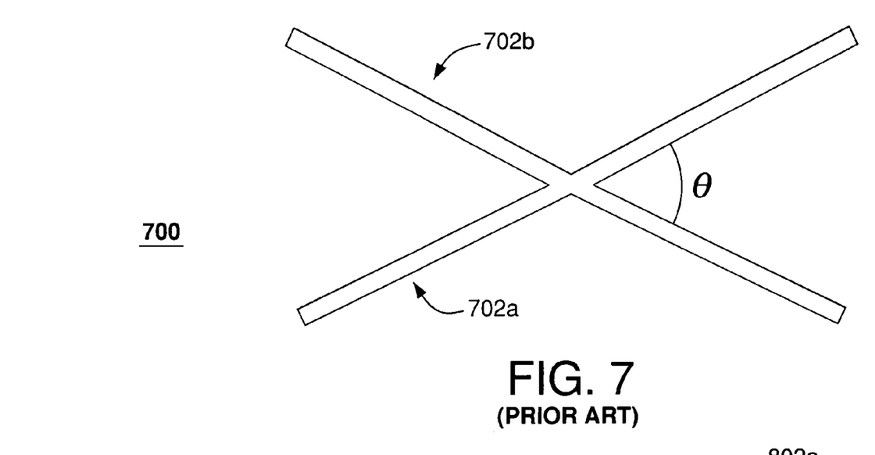
FIG. 7 shows a top view of an optical device having a prior-art waveguide crossing.

FIG. 7 shows a top view of an optical device 700 having a prior-art waveguide crossing. More specifically, device 700 has two waveguides 702a and 702b outlined in FIG. 7 by the contours of their respective core regions intersecting each other at angle θ. Each of the waveguides has its structure perturbed within the intersection by the presence of the other waveguide. The perturbation causes some light to scatter from one waveguide into the other introducing both crosstalk and power loss. In addition, some light is scattered out of the guiding structures altogether further increasing the power loss.

Figure 8:
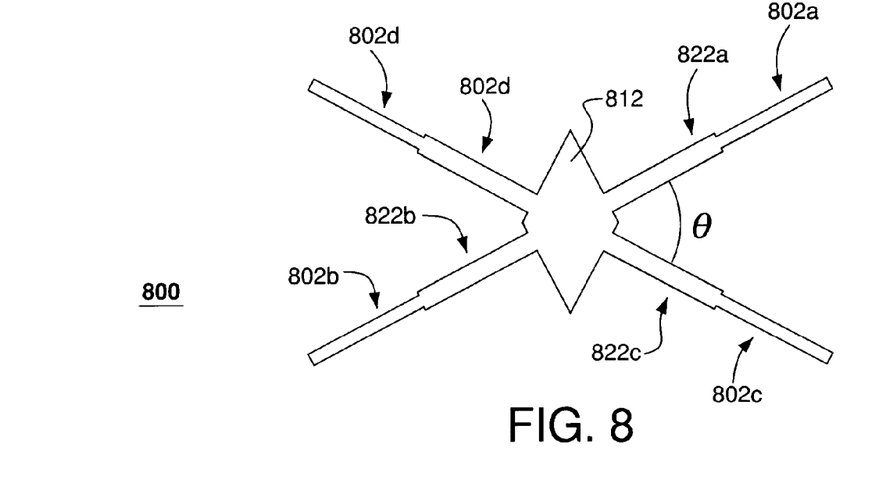
FIG. 8 shows a top view of an optical device having a waveguide crossing implemented in accordance with the principles of the present invention.

FIG. 8 shows a top view of an optical device 800 having an MMI waveguide crossing implemented in accordance with the principles of the present invention. Device 800 has two overlapping waveguide structures, each of which is analogous to that of device 500 (FIG. 5). More specifically, the first waveguide structure includes waveguides 802a–b and 822a–b and a slab region 812, and the second waveguide structure includes waveguides 802c–d and 822c–d and slab region 812. The optical paths corresponding to the two structures cross within the common slab region 812. Each matched pair of waveguides 802i and 822i, where i=a, b, c, or d, forms the corresponding MMI waveguide lens, four lenses total. One pair of these MMI waveguide lenses guides light between waveguides 802a and 802b, while the other pair of lenses guides light between waveguides 802c and 802d. As will be further detailed below, for certain values of θ, the MMI waveguide crossing of device 800 provides a substantial reduction of crosstalk and power loss compared to those parameters in the prior-art waveguide crossing of device 700. The reduction is mostly due to the fact that, in device 800, it is the optical beams that cross within the common slab region, and not the waveguides themselves as in device 700.

FIGS. 9A–D compare the performance of waveguide crossings in devices 700 and 800, with the device parameters corresponding to each figure given in Table 2.

TABLE 2

Parameters of Devices 700 and 800

| FIG. | Δ (%) | Width of core of waveguides 702 and 802 (μm) | Width of core of waveguide 822 (μm) | Length of waveguide 822 (μm) | Distance between coupled waveguides 822 over slab region 812 (μm) |
|---|---|---|---|---|---|
| 9A–B | 0.5 | 9 | 14 | 266 | 88 |
| 9C | 2 | 5 | 7.5 | 68 | 30 |
| 9D | 4 | 3.1 | 5 | 30 | 15.5 |

Figure 9A:
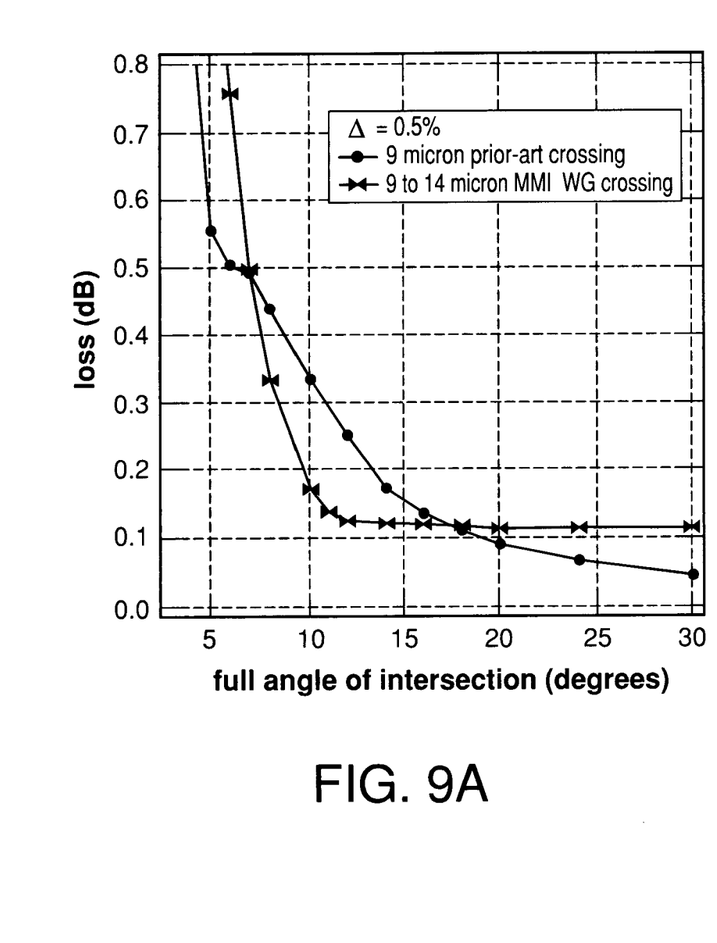
FIGS. 9A–D compare the performance of waveguide crossings in the devices shown in FIGS. 7–8.
Figure 9B:
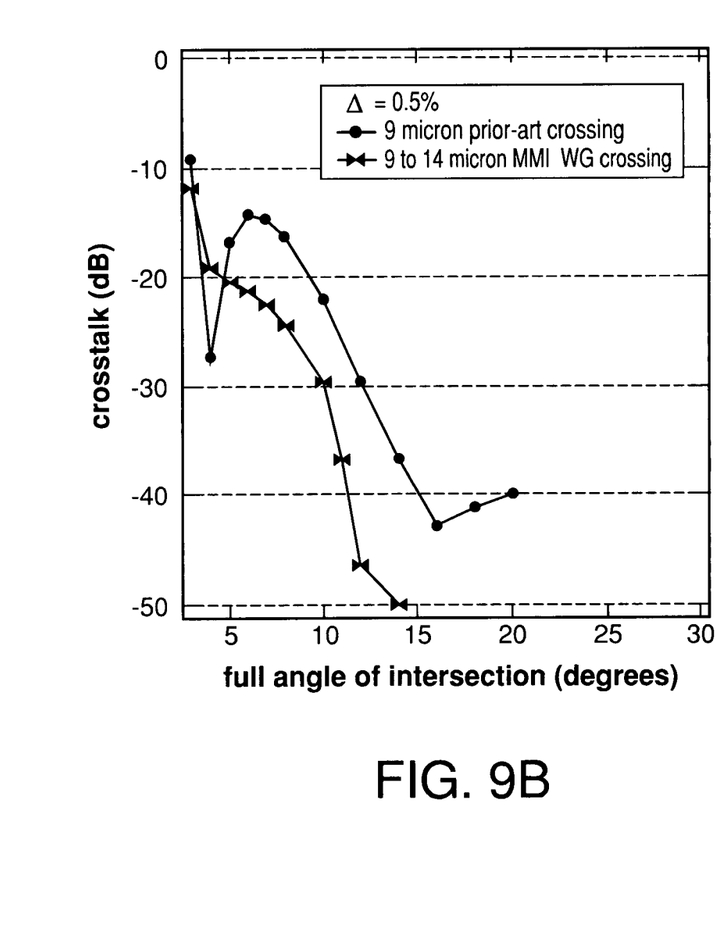

FIGS. 9A–B show the loss and crosstalk, respectively, as functions of intersection angle in devices 700 and 800 implemented with $n_{cl}=1.5$ and $\Delta=0.5\%$, where $n_{cl}$ is the cladding index of refraction and Δ is the index of refraction contrast. The dots and bowties show the characteristics of devices 700 and 800, respectively. Power loss in the prior-art waveguide crossing of device 700 increases monotonically as the intersection angle decreases. Therefore, to minimize the loss, the designer is forced to choose a large intersection angle, which may not always be possible due to the topological constraints of the particular circuit. The MMI waveguide crossing of device 800, on the other hand, shows a non-zero (about 0.11 dB) loss at relatively large angles, but the loss remains substantially constant as the angle decreases down to about 12 degrees, at which point the loss begins to rise. This behavior is due to the fact that, at about 12 degrees, adjacent waveguides 822 begin to overlap slightly at the entrance to slab region 812 (this is a purely geometrical constraint; see FIG. 8). The performance of the MMI waveguide crossing begins to degrade naturally at angles smaller than this 'overlap' angle. Note, however, that over a relatively large range of angles, in this example from about 8 to about 17 degrees, the MMI waveguide crossing notably outperforms the prior-art crossing. In addition, as indicated in FIG. 9B, the crosstalk in the MMI waveguide crossing of device 800 is extremely small in that range of angles.

Figure 9C:
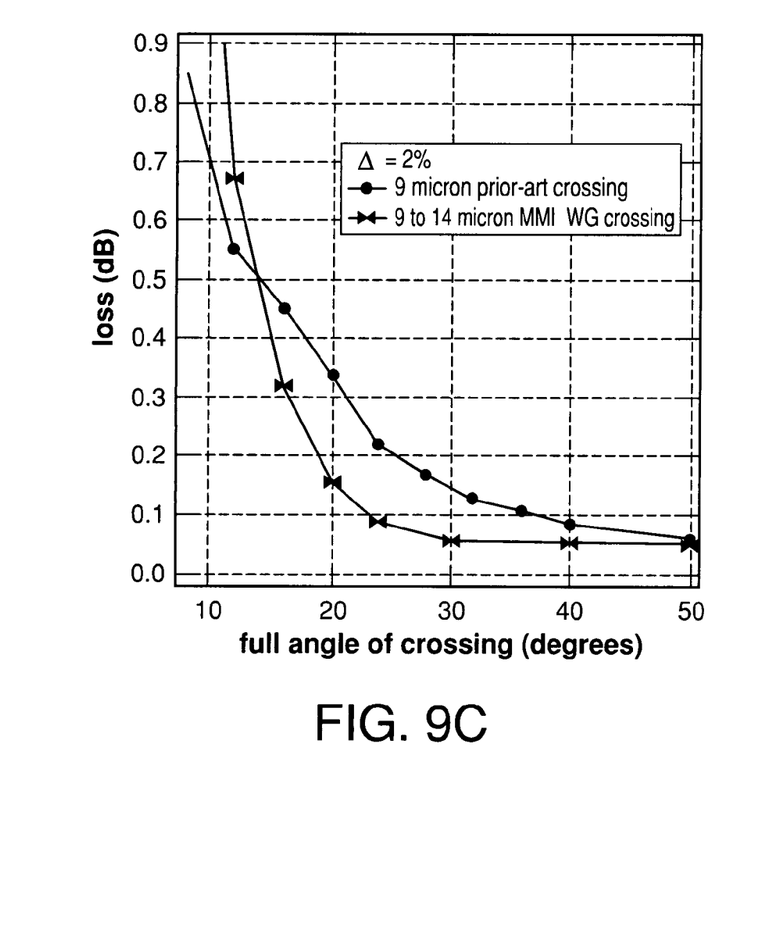
Figure 9D:
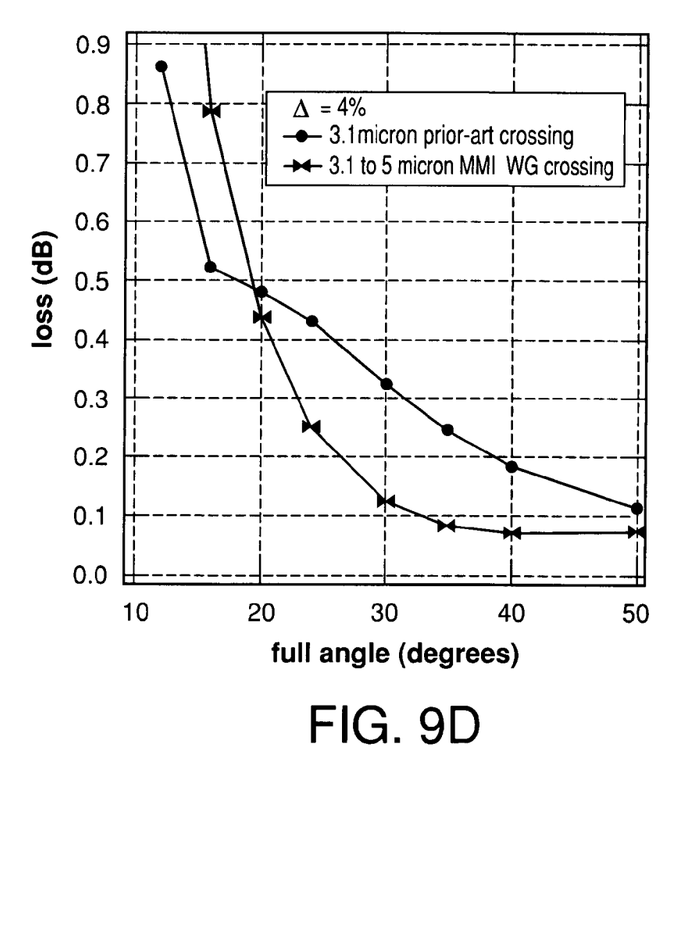

FIGS. 9C–D show the loss as a function of intersection angle in devices 700 and 800 implemented with $n_{cl}=1.5$ and Δ=2% (FIG. 9C) and 4% (FIG. 9D). The dots and bowties show the characteristics of devices 700 and 800, respectively. Both examples illustrated by FIGS. 9C–D are similar in behavior to that of FIG. 9A, with the MMI waveguide crossing of device 800 outperforming the corresponding prior-art crossing of device 700 over a relatively wide range of angles.

It is well understood in the art, that larger intersection angles in waveguide crossings result in better performance. However, smaller intersection angles are often desirable in order to reduce the circuit size. MMI waveguide crossings illustrated in FIG. 8 provide a solution that allows one to decrease the intersection angle without degrading the circuit performance. Advantageously, this gives the designer of waveguide circuits an additional tool that can be used to design circuits having a smaller footprint than analogous prior-art circuits.

Figure 10:
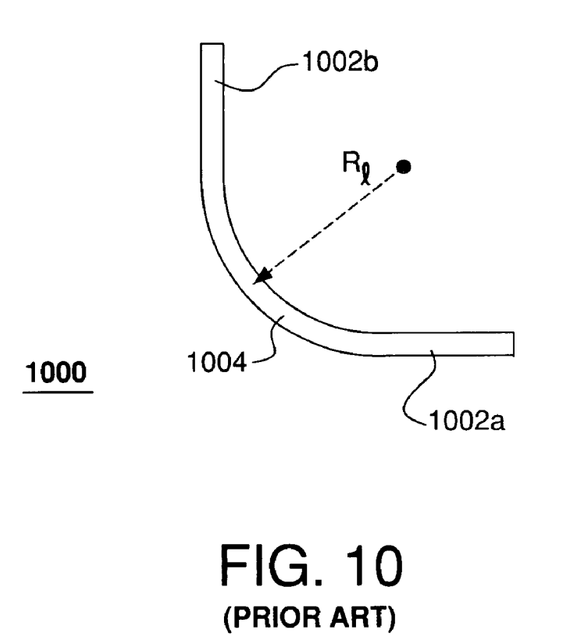
FIG. 10 shows a top view of an optical device having a prior-art waveguide turn.
Figure 11:
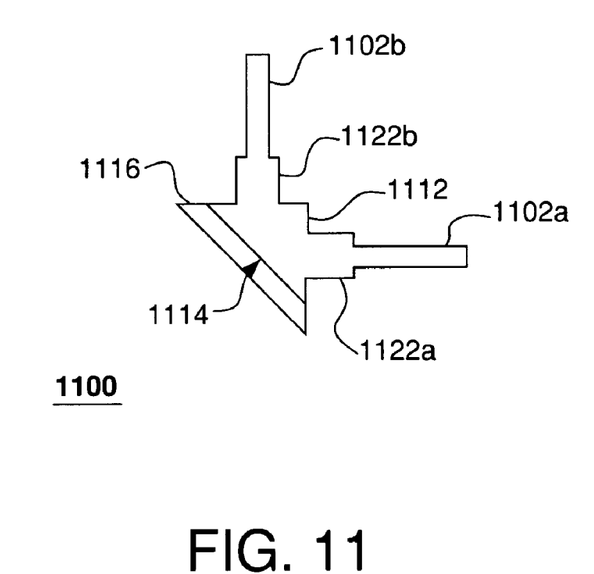
FIG. 11 shows a top view of an optical device having a waveguide turn implemented in accordance with the principles of the present invention.

FIGS. 10 and 11 illustrate one additional application of MMI waveguide lenses, i.e., the implementation of a waveguide turn having a relatively large turn angle, e.g., 90 degrees.

FIG. 10 shows a top view of an optical device 1000 having a prior-art waveguide turn. More specifically, device 1000 has two waveguides 1002a and 1002b oriented at 90 degrees with respect to each other and connected by a curved linker 1004. It is well known in the art that, to avoid large losses, linker 1004 should preferably have a curvature radius greater than a certain minimum value. For example, in circuit 1000 implemented with Δ=0.5%, linker 1004 having a power loss of less than 0.1 dB has the radius, $R_l$, of at least about 5 mm for λ=1.55 μm. As such, the waveguide turn of device 1000 occupies the circuit area of about 5×5 mm$^2$.

FIG. 11 shows a top view of an optical device 1100 having a waveguide turn implemented in accordance with the principles of the present invention. Device 1100 has a waveguide structure substantially analogous to that of device 500 (FIG. 5). More specifically, device 1100 includes waveguides 1102a–b and 1122a–b and a slab region 1112 that are similar to the waveguides 502a–b and 522a–b and slab region 512, respectively, of device 500. However, one difference between devices 1100 and 500 is that the matched pairs of waveguides 1102 and 1122 in device 1100 are oriented at 90 degrees with respect to each other. Another difference is that slab region 1112 has an adjacent mirror 1114, which provides optical coupling between the matched waveguide pairs. For example, a light beam entering slab region 1112 from waveguide 1122a is reflected by mirror 1114 in the direction of waveguide 1122b where it is collected by said waveguide as previously described for device 500. In one embodiment, mirror 1114 is implemented using the effect of total internal reflection (TIR) by creating an air gap 1116 adjacent to slab region 1112 as shown in FIG. 11. When device 1100 is implemented with Δ=0.5%, the total circuit area for the waveguide turn having the power loss of less than 0.1 dB is about 300×300 μm$^2$ (see Table 1), which is a substantial circuit area reduction over the waveguide turn of device 1000.

While this invention has been described with reference to illustrative embodiments, this description is not intended to be construed in a limiting sense. For example, the invention may be practiced using TE and/or TM modes. Although, MMI lenses of the invention were described as employing $TE_0$ and $TE_2$ modes, additional and/or different modes may also be used. A different (i.e., other than the fundamental) mode of waveguide 202 may be used to pump waveguide 222. Although the coupling of waveguide 202 to waveguide 222 was described as an abrupt transition, such coupling could also be accomplished using a non-adiabatic tapered transition. Waveguide turns of the invention may be implemented with non-TIR mirrors and have angles other than 90 degrees. Devices of the invention may be designed for different wavelengths and used for transmission of optical signals modulated with data. The principles of the invention may be applied to non-planar waveguides. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An optical device, comprising a first waveguide lens optically coupled to a second waveguide lens via a slab region, wherein:
   for each of the first and second waveguide lenses,
     the waveguide lens comprises a first optical waveguide connected to a second optical waveguide, wherein:
       the second waveguide is a multimode waveguide;
       a first mode of the first waveguide couples to at least two modes of the second waveguide; and
       the second waveguide has a length selected such that, when the first mode excites the at least two modes, the second waveguide outputs a converging beam of light; and
   if an optical signal is coupled to the first mode of the first waveguide in the first waveguide lens, the converging beam of light produced by the second waveguide of the first waveguide lens enters the slab region, wherein said converging beam transforms into a corresponding diverging beam, which impinges upon the second waveguide of the second waveguide lens, wherein:
     the diverging beam couples to at least two modes of the second waveguide of the second waveguide lens; and
     the at least two modes of the second waveguide in the second waveguide lens couple to the first mode of the first wave guide in the second waveguide lens.

2. The device of claim 1, wherein the second waveguide lens is configured to collect light emitted from the first waveguide lens.

3. The device of claim 1, wherein:
   an axis corresponding to the first waveguide lens is oriented at an angle with respect to an axis corresponding to the second waveguide lens;
   the slab region has a mirror configured to direct light between the first and second waveguide lenses.

4. The device of claim 3, wherein the angle is about 90 degrees.

5. The device of claim 3, wherein the mirror is implemented with an air gap adjacent to a reflecting surface of the mirror.

6. The device of claim 1, wherein:
   each of the first and second waveguide lenses is characterized by a corresponding focal length; and
   the slab region has a size substantially equal to the sum of said focal lengths.

7. The device of claim 1, further comprising a third waveguide lens optically coupled to a fourth waveguide lens via the slab region to form a waveguide crossing with the first and second waveguide lenses, wherein:
   for each of the third and fourth waveguide lenses,
     the waveguide lens comprises a first optical waveguide connected to a second optical waveguide, wherein:
       the second waveguide is a multimode waveguide;
       a first mode of the first waveguide couples to at least two modes of the second waveguide; and
       the second waveguide has a length selected such that, when the first mode excites the at least two modes, the second waveguide outputs a converging beam of light.

8. The device of claim 7, wherein:
   the second waveguide lens is configured to collect light emitted from the first waveguide lens; and
   the fourth waveguide lens is configured to collect light emitted from the third waveguide lens.

9. The device of claim 1, wherein the second waveguide in the second waveguide lens has a length selected such that, when the diverging beam is applied to the second waveguide of the second waveguide lens, substantially full energy of the diverging beam is transferred into the first mode of the first waveguide in the second waveguide lens.

10. The method of claim 9, wherein power loss between the first waveguide of the first waveguide lens and the first waveguide of the second waveguide lens is lower than about 0.1 dB.

11. A method of transmitting optical signals, the method comprising:
   (A) coupling an optical signal to a first mode of a first waveguide;
   (B) applying the first mode of the first waveguide to a second waveguide, wherein:
     the second waveguide is a multimode waveguide;
     the first mode of the first waveguide couples to at least two modes of the second waveguide; and
     the second waveguide has a length selected such that, when the first mode excites the at least two modes of the second waveguide, substantially full energy of said first mode is transferred into a converging beam of light output from the second waveguide;
   (C) applying the converging beam of light to a slab region, wherein said converging beam transforms into a corresponding diverging beam; and
   (D) applying the diverging beam to a third waveguide, wherein:
     the third waveguide is a multimode waveguide;
     the diverging beam couples to at least two modes of the third waveguide; and
     the at least two modes of the third waveguide couple to a first mode of a fourth waveguide.

12. The method of claim 11, wherein:
   the third waveguide has a length selected such that, when the diverging beam is applied to the third waveguide, substantially full energy of the diverging beam is transferred into the first mode of the fourth waveguide.

13. The method of claim 11, wherein the first and fourth waveguides are single-mode waveguides.

14. The method of claim 11, wherein power loss between the first waveguide and the fourth waveguide is lower than about 0.1 dB.

15. The method of claim 11, wherein:
the first and second waveguides form a first waveguide lens;
the third and fourth waveguides form a second waveguide lens;
each of the first and second waveguide lenses is characterized by a corresponding focal length; and
the slab region has a size substantially equal to the sum of said focal lengths.

16. An optical device, comprising a first waveguide lens optically coupled to a second waveguide lens via a slab region, wherein:
for each of the first and second waveguide lenses,
the waveguide lens comprises a first optical waveguide connected to a second optical waveguide, wherein:
the second waveguide is a multimode waveguide;
a first mode of the first waveguide couples to at least two modes of the second waveguide; and
the second waveguide has a length selected such that, when the first mode excites the at least two modes, the second waveguide outputs a converging beam of light;
an axis corresponding to the first waveguide lens is oriented at an angle with respect to an axis corresponding to the second waveguide lens;
the slab region has a mirror configured to direct light between the first and second waveguide lenses.

17. The device of claim 16, wherein the angle is about 90 degrees.

18. The device of claim 16, wherein the mirror is implemented with an air gap adjacent to a reflecting surface of the mirror.

19. An optical device, comprising:
a first waveguide lens optically coupled to a second waveguide lens via a slab region, wherein, for each of the first and second waveguide lenses,
the waveguide lens comprises a first optical waveguide connected to a second optical waveguide, wherein:
the second waveguide is a multimode waveguide;
a first mode of the first waveguide couples to at least two modes of the second waveguide; and
the second waveguide has a length selected such that, when the first mode excites the at least two modes, the second waveguide outputs a converging beam of light; and
a third waveguide lens optically coupled to a fourth waveguide lens via the slab region to form a waveguide crossing with the first and second waveguide lenses, wherein, for each of the third and fourth waveguide lenses,
the waveguide lens comprises a first optical waveguide connected to a second optical waveguide, wherein:
the second waveguide is a multimode waveguide;
a first mode of the first waveguide couples to at least two modes of the second waveguide; and
the second waveguide has a length selected such that, when the first mode excites the at least two modes, the second waveguide outputs a converging beam of light.

20. The device of claim 19, wherein:
the second waveguide lens is configured to collect light emitted from the first waveguide lens; and
the fourth waveguide lens is configured to collect light emitted from the third waveguide lens.

* * * * *